US011860857B2

(12) United States Patent
Roy et al.

(10) Patent No.: US 11,860,857 B2
(45) Date of Patent: Jan. 2, 2024

(54) MUSS—MAP USER SUBMISSION STATES

(71) Applicant: Google LLC, Mountain View, CA (US)

(72) Inventors: Subhasish Roy, Hyderabad (IN); Bradford Scott Sullivan, Seattle, WA (US); Thomas J. Wysocki, Seattle, WA (US)

(73) Assignee: Google LLC, Mountain View, CA (US)

( * ) Notice: Subject to any disclaimer, the term of this patent is extended or adjusted under 35 U.S.C. 154(b) by 12 days.

(21) Appl. No.: 17/078,391

(22) Filed: Oct. 23, 2020

(65) Prior Publication Data

US 2022/0129440 A1 Apr. 28, 2022

(51) Int. Cl.
*G06F 16/29* (2019.01)
*G06F 16/23* (2019.01)
*G06F 16/215* (2019.01)
*G06F 16/21* (2019.01)

(52) U.S. Cl.
CPC ........ *G06F 16/2379* (2019.01); *G06F 16/211* (2019.01); *G06F 16/215* (2019.01); *G06F 16/29* (2019.01)

(58) Field of Classification Search
USPC .......................................................... 707/703
See application file for complete search history.

(56) References Cited

U.S. PATENT DOCUMENTS

| 8,073,845 B2* | 12/2011 | Homma | G01C 21/3611 707/723 |
| 8,862,492 B1* | 10/2014 | Kulshreshtha | G06Q 50/01 705/7.32 |
| 10,127,564 B2* | 11/2018 | Heath | G06Q 50/01 |
| 10,247,570 B2* | 4/2019 | Aben | G01C 21/3679 |
| 10,856,106 B1* | 12/2020 | Ganesan | H04W 4/023 |
| 11,418,908 B1* | 8/2022 | Venkatakrishnan | G06F 16/29 |
| 2002/0035432 A1* | 3/2002 | Kubica | G06F 16/29 702/5 |
| 2005/0278386 A1* | 12/2005 | Kelly | G06F 16/29 |
| 2008/0268876 A1* | 10/2008 | Gelfand | H04W 4/02 455/457 |
| 2009/0234847 A1* | 9/2009 | Homma | G01C 21/3611 704/E15.005 |
| 2011/0087427 A1* | 4/2011 | Liu | G01C 21/3679 715/810 |
| 2013/0036099 A1* | 2/2013 | Liu | G01C 21/20 707/690 |

(Continued)

*Primary Examiner* — Hanh B Thai
(74) *Attorney, Agent, or Firm* — Lerner David LLP

(57) ABSTRACT

The present disclosure provides systems and methods for an interactive user interface that allows for one or more submissions of update information related to a point of interest to be reviewed. The system may receive the submission from a computing device. The system may analyze the submission to determine the type of content, such as the name, address, website, photo, etc. related to the point of interest. The type of content may be classified using a machine learning model. The model may compare the content of the submission to a model of the type of content to determine whether the submission is approved for publishing or whether additional information is needed. The system may transmit one or more notifications to the computing device. The notifications may include updates on the workflow status of the submission.

20 Claims, 8 Drawing Sheets

(56) References Cited

U.S. PATENT DOCUMENTS

| | | | |
|---|---|---|---|
| 2013/0254168 A1* | 9/2013 | Leman | G06F 16/215 |
| | | | 707/687 |
| 2015/0012501 A1* | 1/2015 | Xing | G06F 16/215 |
| | | | 707/690 |
| 2018/0144369 A1* | 5/2018 | Pouliot | B60W 10/08 |
| 2019/0244123 A1* | 8/2019 | Kulshreshtha | G09B 29/106 |
| 2020/0065912 A1* | 2/2020 | Bender | G06V 30/40 |
| 2020/0072636 A1* | 3/2020 | Balakrishna | G01C 21/3492 |
| 2020/0300656 A1* | 9/2020 | Weilert | G01C 21/32 |
| 2021/0254994 A1* | 8/2021 | Aït-Mokhtar | G06F 16/3344 |

* cited by examiner

MUSS—MAP USER SUBMISSION STATES

BACKGROUND

A user interface allows a user to submit an update to content relating to a point of interest. It is desirable that situations where the post-submission user experience is limited and lacks user engagement be improved. For example, in cases where a user submission is approved, the user may only be notified that the submission was approved. In cases where the submission is rejected, the user may only ne notified that the submission was rejected with no opportunity to correct or supplement the submission. This may leave users frustrated and unwilling to contribute updated content.

BRIEF SUMMARY

The disclosed technology generally relates to systems and methods for determining whether to update information related to a point of interest based on one or more submissions of content related to the point of interest. The content may include update information related to the point of interest. The system may analyze the submission to determine a type of content related to the point of interest, such as the name, address, website, phone number, etc. The type of content may be classified based on a machine learning ("ML" model). The ML model may compare the content of the submission to one or more training models to determine whether the content of the submission should be approved for publishing or whether additional information is needed before the content can be approved. The system may transmit notifications to a computing device. The notifications may indicate a workflow status of the submission. The notifications may additionally or alternatively include messages stating that more information is needed, the submission has been approved for publishing, a link to the updated information, etc. In examples where more information is needed, the system may receive and combine the subsequent submissions with the original submission for review.

One aspect of the disclosure includes a method for updating a point of interest on a map, the method comprises receiving, as input through a user interface, a submission having update information for the point of interest, determining whether the update information is associated with the point of interest by comparing features associated with the point of interest with the update information, if the determination indicates that the update information is associable with the point of interest, providing notification at the user interface that the point of interest is tagged with the update information, and if the determination indicates that the update information is not associable with the point of interest, providing notification at the user interface that the point of interest cannot be tagged with the update information or providing a request at the user interface for additional information associated with the submission.

Determining whether the update information is associated with the point of interest by comparing features associated with the point of interest with the update information may comprise providing the update information as input to a model and comparing features classified in the model as associated with the point of interest with the update information. The method may further comprise providing notification at the user interface that the point of interest is tagged with the update information if the comparison indicates that the update information is associated with a given number of the features above a specified threshold. The method may further comprise updating the model if the update information meets the threshold. The features may comprise one or more of an image of the point of interest, signage associated with the point of interest, or a reference location nearby the point of interest.

The method may further comprise receiving, as input through the user interface, a second submission having update information for the point of interest, combining the update information from the submission and the update information from the second submission to form combined update information, determining whether the combined update information is associated with the point of interest by comparing features associated with the point of interest with the combined update information, if the determination indicates that the combined update information is associable with the point of interest, providing notification at the user interface that the point of interest is tagged with the combined update information, and if the determination indicates that the combined update information is not associable with the point of interest, providing notification at the user interface that the point of interest cannot be tagged with the combined update information or providing a request at the user interface for additional information associated with the submission.

Another aspect of the disclosure includes a non-transitory computer-readable medium storing instructions, which when executed by one or more processors, cause the one or more processors to receive, as input through a user interface, a submission having update information for the point of interest, determine whether the update information is associated with the point of interest by comparing features associated with the point of interest with the update information, if the determination indicates that the update information is associable with the point of interest, provide a first notification at the user interface that the point of interest is tagged with the update information, and if the determination indicates that the update information is not associable with the point of interest, provide a second notification at the user interface that the point of interest cannot be tagged with the update information or provide a request at the user interface for additional information associated with the submission.

Yet another aspect of the disclosure includes a method, comprising receiving, by one or more processors, a submission including content related to a point of interest, analyzing, by the one or more processors, the submission to determine a type of content, classifying, by the one or more processors, the type of content using a model, determining, by the one or more processors based on the classification of the type of content, whether the submission meets a threshold corresponding to the point of interest, and updating, by the one or more processors, the point of interest based on the submission when the submission meets the threshold corresponding to the point of interest, or transmitting, by the one or more processors, a first notification when the submission does not meet the threshold corresponding to the point of interest.

The first notification may include a request for additional content related to the point of internet. The point of interest may be updated based on the submission, the method further includes transmitting, by the one or more processors, a second notification including a uniform resource locator ("URL") corresponding to the updated point of interest.

The model may be a machine learning model. The machine learning model may include input features corresponding to one or more types of content. The one or more types of content may include a name, an address, a phone number, one or more street view images, one or more interior images, or business hours corresponding to the point of interest.

The method may further comprise receiving, by the one or more processors based on the notification that the submission does not meet the threshold, a secondary submission corresponding to the submission, combining, by the one or more processors, the submission and the secondary submission to form an updated submission, analyzing, by the one or more processors, the updated submission to determine a second type of content, classifying, by the one or more processors, the second type of content using the model, determining, by the one or more processors based on the classification of the second type of content, whether the updated submission meets a threshold corresponding to the point of interest, and updating, by the one or more processors, the point of interest based on the updated submission when the updated submission meets the threshold corresponding to the point of interest, or transmitting, by the one or more processors, a third notification when the updated submission does not meet the threshold corresponding to the point of interest.

The method may further comprise transmitting, by the one or more processors, a status notification indicating a workflow status of the submission.

DETAILED DESCRIPTION

Figure 1A:
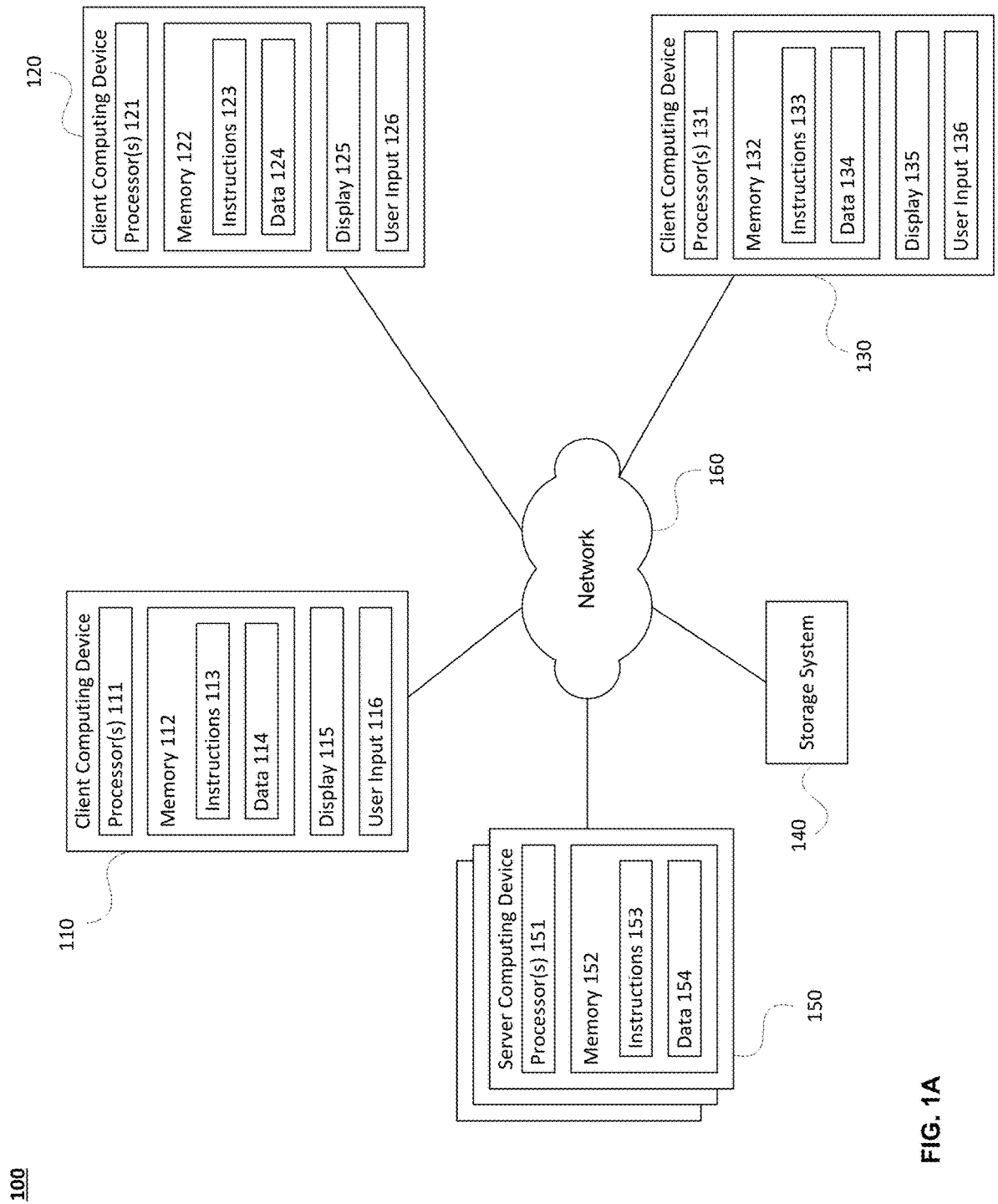
FIGS. 1A-1C are functional diagrams of an example system in accordance with aspects of the disclosure.

The disclosed technology relates generally to a system that receives submissions related to a point of interest and determines whether to approve, or publish, the submissions. For instance, the system may receive a submission including one or more types of content related to the point of interest. The submission may include content that is different than what is currently published or publicly accessible relating to the point of interest. The types of content may include a photo, phone number, address, business hours, etc. relating and/or corresponding to the point of interest. The content may be moderated, or analyzed, to determine whether to accept the content in the submission, reject the content in the submission, or whether more content is necessary to make a determination.

The submission may be stored in an input database. An input processor may convert the submission to make the submission compatible, or consumable, for a machine learning ("ML") model.

The ML model may be trained to determine whether the submission meets a threshold. The threshold may correspond to the quality of the submission. In some examples, the threshold may be a score corresponding to the quality or accuracy of the submission. In other examples, the threshold may comprise a metric that indicates a confidence level that the submission is related to the point of interest. The metric may be determined by reference to other information linked to the point of interest including images, objects in images, other points of interest within range of a reference point or other data that the point of interest is associated with the information provided in the submission. The threshold may be met, for example, if the metric indicates that a given number, e.g., three, items of other information associated with the point of interest correlate to information in the submission. The other information may comprise information autonomously accessed by the system from a database or as a result of computing operations associated with data mining public available sources, e.g., images, articles, etc. The input features to the ML model may include the types of content within the submission, such as the name, address, phone number, street view image, interior images, business hours, etc. pertaining to the point of interest. The ML model may use the input features to more accurately determine whether the submission meets a threshold. The output of processing using the ML model includes information reflecting a determination whether the submission meets the threshold.

According to some examples, the submission may include a type of content unknown to the ML model. The ML model may classify the new type of content. For example, the submission may include a list of specials for a restaurant on a particular day. The ML model may determine the new type of content to be "daily specials." The ML model may then update the model so that the submission is associated with "daily specials."

An input manager may manage the submission and any notifications regarding the submission. In examples where the ML model determines that the submission meets the threshold, the input manager may transmit a notification indicating that the submission has been published. For example, the notification may include a uniform resource locator ("URL") or website address corresponding to the point of interest. The content of the submission may be found in that URL or website address.

In some examples, the ML model may determine that the submission does not meet the threshold. In response, the input manager may transmit a notification indicating that submission does not meet the threshold. According to some examples, the notification may indicate specific additional content needed such that the submission would meet the threshold.

The system may receive a secondary submission related to the original submission. The secondary submission may be combined with and/or added to the original submission to create an updated submission. The updated submission may be moderated similar to the original submission. In such an example, the input manager may direct the updated submission to go through remoderation. In such an example, the updated submission may be analyzed to determine the type of content within the submission. The types of content may be compared to one or more training examples, or models, within the ML model. If the updated submission meets a threshold corresponding to the point of interest, the information relating to the point of interest is updated based on the content in the submission. If the submission does not meet the threshold, a notification is transmitted requesting an additional submission.

Example Systems

Figure 1B:
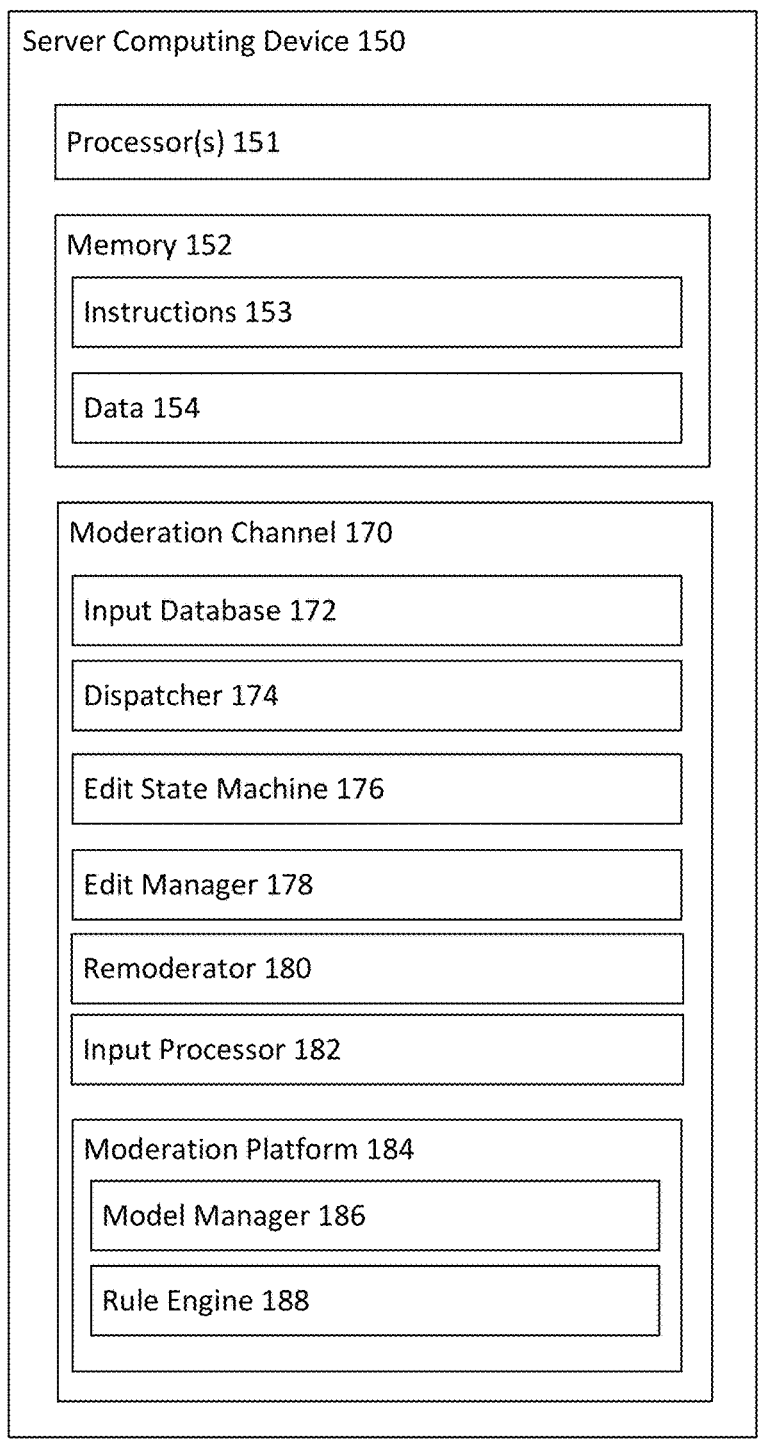

FIGS. 1A and 1B illustrates an example system in which the features described above may be implemented. It should not be considered limiting the scope of the disclosure or usefulness of the features described herein. In this example, system 100 may include a plurality of computing devices 110, 120, 130, storage system 140, server computing device 150, and network 160.

Each computing device 110, 120, 130 may include one or more processors 111, 121, 131, memory 112, 122, 132, data 114, 124, 134, and instructions 113, 123, 133. Each of computing devices 110, 120, 130 may also include a display 115, 125, 135 and user input 116, 126, 136.

For purposes of ease, computing devices 110, 120, 130 may be collectively or individually referred to as computing device 110, the one or more processors 111, 121, 131 may be collectively or individually referred to as one or more processors 111, memory 112, 122, 132 may be collectively or individually referred to as memory 112, data 114, 124, 134 may be collectively or individually referred to as data 114, instructions 113, 123, 133 may be collectively or individually referred to as instructions 113, display 115, 125, 135 may be collectively or individuals referred to as display 115, and user input 116, 126, 136 may be collectively or individuals referred to as user input 116.

Memory 112 of computing device 110 may store information that is accessible by processor 111. Memory 112 may also include data that can be retrieved, manipulated or stored by the processor 111. The memory 112 may be of any non-transitory type capable of storing information accessible by the processor 111 including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. Memory 112 may store information that is accessible by the processors 111 including instructions 113 that may be executed by processors 111 and data 114.

Data 114 may be retrieved, stored or modified by processors 111 in accordance with instructions 113. For instance, although the present disclosure is not limited by a particular data structure, the data 114 may be stored in computer registers, in a relational database as a table having a plurality of different fields and records, XML documents, or flat files. The data 114 may also be formatted in a computer-readable format such as, but not limited to, binary values, ASCII or Unicode. By further way of example only, the data 114 may comprise information sufficient to identify the relevant information, such as numbers, descriptive text, proprietary codes, pointers, references to data stored in other memories (including other network locations) or information that is used by a function to calculate the relevant data.

The instructions 113 can be any set of instructions to be executed directly, such as machine code, or indirectly, such as scripts, by the processor 111. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The one or more processors 111 may include any conventional processors, such as a commercially available CPU or microprocessor. Alternatively, the processor can be a dedicated component such as an ASIC or other hardware-based processor. Although not necessary, computing devices 110 may include specialized hardware components to perform specific computing functions faster or more efficiently.

Although FIG. 1A functionally illustrates the processor, memory, and other elements of computing devices 110 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of the computing devices 110. Accordingly, references to a processor or computing device will be understood to include references to a collection of processors or computing devices or memories that may or may not operate in parallel.

Display 115 and other displays described herein may be any type of display, such as a monitor having a screen, a touch-screen, a projector, or a television. The display 115 of the one or more computing devices 110 may electronically display information to a user via a graphical user interface ("GUI") or other types of user interfaces. For example, as will be discussed below, display 115 may electronically display a notification indicating the status of a submission relating to a point of interest.

The user inputs 116 may be a mouse, keyboard, touch-screen, microphone, or any other type of input.

The computing devices 110 may be located at various nodes of a network 160 and capable of directly and indirectly communicating with other nodes of network 160. Although three (3) computing devices are depicted in FIG. 1A, it should be appreciated that a typical system can include one or more computing devices, with each computing device being at a different node of network 160. The network 160 and intervening nodes described herein can be interconnected using various protocols and systems, such that the network can be part of the Internet, World Wide Web, specific intranets, wide area networks, or local networks. The network 160 can utilize standard communications protocols, such as WiFi, that are proprietary to one or more companies. Although certain advantages are obtained when information is transmitted or received as noted above, other aspects of the subject matter described herein are not limited to any particular manner of transmission.

In one example, system 100 may include one or more server computing devices 150 having a plurality of computing devices, e.g., a load balanced server farm, that exchange information with different nodes of a network for the purpose of receiving, processing and transmitting the data to and from other computing devices. For instance, one or more server computing devices 150 may be a web server that is capable of communicating with the one or more client computing devices 110 via the network 160. In addition, server computing device 150 may use network 160 to transmit and present information to a user of one of the other computing devices 110. Server computing device 150 may include one or more processors 151, memory 152, instructions 153, and data 154. These components operate in the same or similar fashion as those described above with respect to computing devices 110. Server computing device 150 may include a moderation channel 170.

Moderation channel 170 may receive, store, analyze, etc. a submission related to a point of interest. The submission may include one or more suggested updates related to the point of interest. For example, the submission may include update information corresponding to the hours of operation, the location, photos of the front facade or interior of the point of interest, etc. The moderation channel 170 may include input database 172, dispatcher 174, edit state machine 176, edit manager 178, remoderator 180, input processor 182, and moderation platform 184. Although FIG. 1B functionally illustrates the input database 172, dispatcher 174, edit state machine 176, edit manager 178, remoderator 180, input processor 182, and moderation platform 184 of moderation channel 170 as being within the moderation channel 170, it will be understood by those of ordinary skill in the art that the components may not be stored within the same physical housing. It will be understood that each component of the moderation channel may actually include multiple processors or memories that may or may not be stored within the same physical housing.

Input database 172 may store one or more submissions related to a point of interest. Dispatcher 174 may receive and/or retrieve the submission from input database 172 and dispatch the submission to the next step of processing. According to some examples, dispatcher 174 may create a ticket or internal identifier to track the proposed changed with respect to the point of interest. Dispatcher 174 may dispatch submissions in one or more parts to one or more components within moderation channel 170.

Edit state machine 176 may change and/or update one or more workflow states of the submission. For example, the one or more workflow states may include pending, approved, more information required, rejected, etc. The workflow state of the submission may change one or more times from the time the submission is received by input database 172 until the time the submission exits moderation channel 170. The submission may exit moderation channel 170 after the submission is published, when the submission is rejected, etc.

Edit manager 178 may move and/or direct the submission to a different component within moderation channel 170 based on the workflow state. For example, when the workflow state of the submission is pending, edit manager 178 may direct the submission to moderation platform 184. In some examples, when the workflow state of the submission is "more information required," edit manager 178 may direct the submission to remoderator 180.

Edit manager 178 may provide and/or transmit notifications to computing device 110 indicating the state of the submission. For example, if edit state machine 176 updates the submission workflow state to approved, edit manager 178 may move the submission to storage system 140. In such an example, edit manager 178 may transmit a notification to the computing device 110 indicating that the submission has been approved. According to some examples, edit state machine 176 may update the submission workflow state to pending. In such an example, edit manager 178 may move the submission to moderation platform 184 and transmit a notification to the computing device 110 that the submission is pending or currently undergoing review.

Remoderator 180 may combine one or more submissions related to a point of interest. For example, server computing device 150 may receive a first submission related to a point of interest. The first submission may not include enough information, may not include properly formatted information, may include inaccurate or conflicting information, etc., and, therefore, may not be able to be validated such that the content related to the point of interest is updated. In such an example, edit manager 178 may transmit a notification to computing device 110 requesting additional, updated, and/or corrected information. Server computing device 150 may receive a second submission with the additional, updated, and/or corrected information relating to the point of interest.

Remoderator 180 may combine the first and second submissions into a single combined submission for review by moderation channel 170.

Input processor 182 may convert the one or more submissions saved in input database 172 into a format compatible, or consumable, for the ML model.

Moderation platform 184 may include model manager 186 and rule engine 188.

Model manager 186 may include the ML model. The ML model may be trained to determine whether the submission meets a threshold corresponding to the quality and/or accuracy of the submission. The ML model may be trained using one or more input features. The input features may correspond to one or more types of content such as the name, address, phone number, street view image, interior images, business hours, etc. pertaining to the point of interest. The ML model may use the input features to more accurately determine whether the submission meets a threshold. The output of processing using the ML model includes information reflecting a determination whether the submission meets the threshold.

Model manager 182 may update the ML model based on new types of content within the submission. For example, model manager 182 may classify the new type of content within the submission. The classified type of content may be included as an input feature of the ML model for future submissions.

Rule engine 188 may process the submission using one or more heuristics. Each of the one or more heuristics may define a function or rule for processing the submission according to the function or rule. For example, if the submission include an update to the category of the point of interest, a heuristics may be removing submissions or input that includes numbers. According to some examples, the heuristics may be based on type of content submitted. For example, the heuristics may only process a certain type or content. Additionally or alternatively, the heuristics may not process a certain type of content. The processing of the submission by rule engine 184 may allow the submissions to be more consistent and/or streamlined for input into the ML model.

Storage system 140 may store various types of content or data. For instance, the storage system 140 may store content related to a point of interest. The content may include, for example, a photo, phone number, address, business hours, etc. relating and/or corresponding to the point of interest. The content related to the point of interest may be changed, or updated, based on one or more submissions related to the point of interest.

Figure 1C:
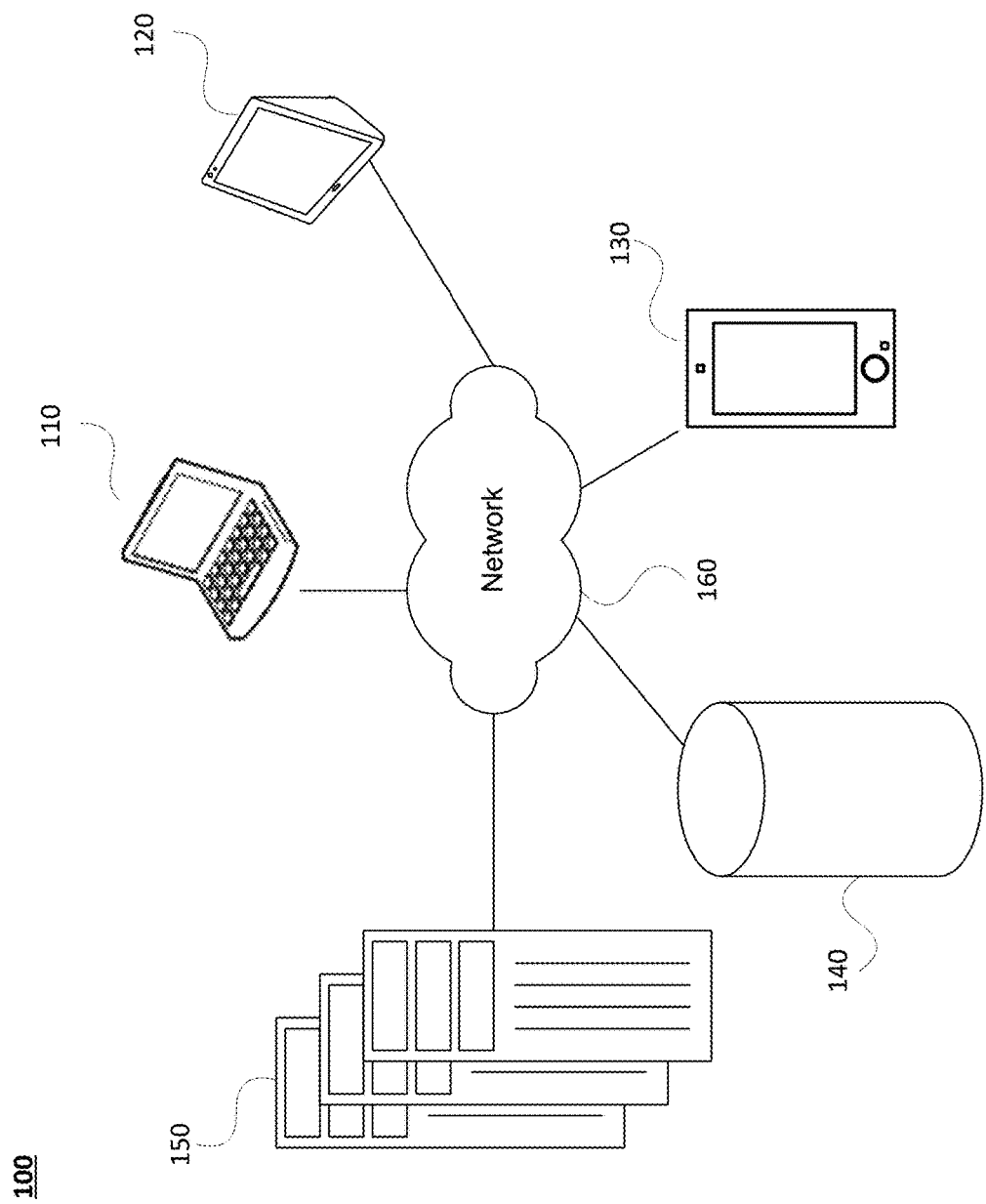

As shown in FIG. 1C, each computing device 110 may be a personal computing device intended for use by a respective user and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another. Computing devices 110 may be capable of wirelessly exchanging and/or obtaining data over the network 160.

The devices 110 may each be a mobile computing device capable of wirelessly exchanging data with a server over a network such as the Internet, or a full-sized personal computing device. By way of example only, devices may include mobile phones 130, wireless-enabled PDAs, tablet PC, a netbook that is capable of obtaining information via the Internet or other networks 160, wearable computing devices (e.g., a smartwatch, headset, smartglasses, virtual reality player, other head-mounted display, etc.), wireless speakers, home assistants 120, gaming consoles, etc.

Example Methods

In addition to the operations described above and illustrated in the figures, various operations will now be described. It should be understood that the following operations do not have to be performed in the precise order described below. Rather, various steps can be handled in a different order or simultaneously, and steps may be added or omitted.

Figure 2:
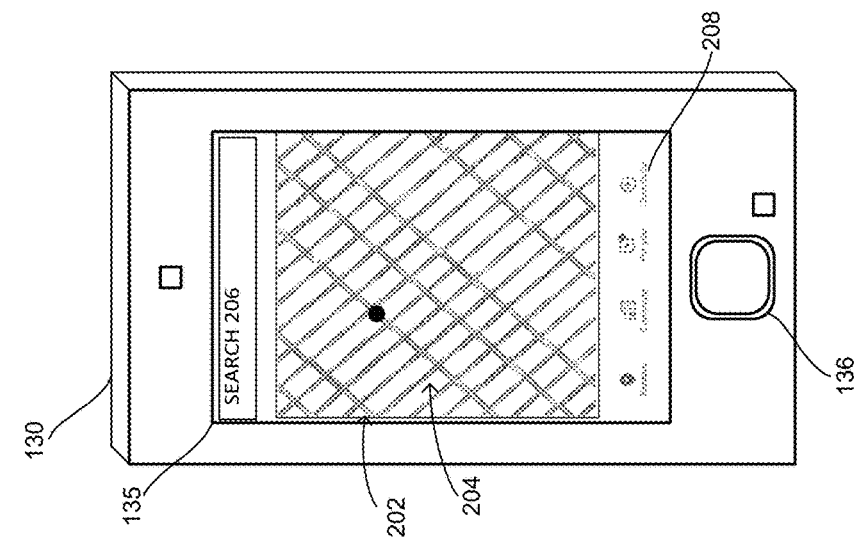
FIG. 2 illustrates an example user interface of an application in accordance with aspects of the disclosure.

Referring now to FIG. 2, computing device 130 is being shown as being used in conjunction with system 100. Server computing device 150 may receive a submission from computing device 130. The submission may include update information or content related to a point of interest. The point of interest may be a store, a restaurant or café, a movie theater, bowling alley, landmark, museum, etc. The point of interest may be determined and/or selected using a search 206 of mapping application 202. For example, a search for a point of interest in mapping application 202 may identify one or more points of interest on map 204. In some examples, the point of interest may be selected from a web search.

Figure 3:
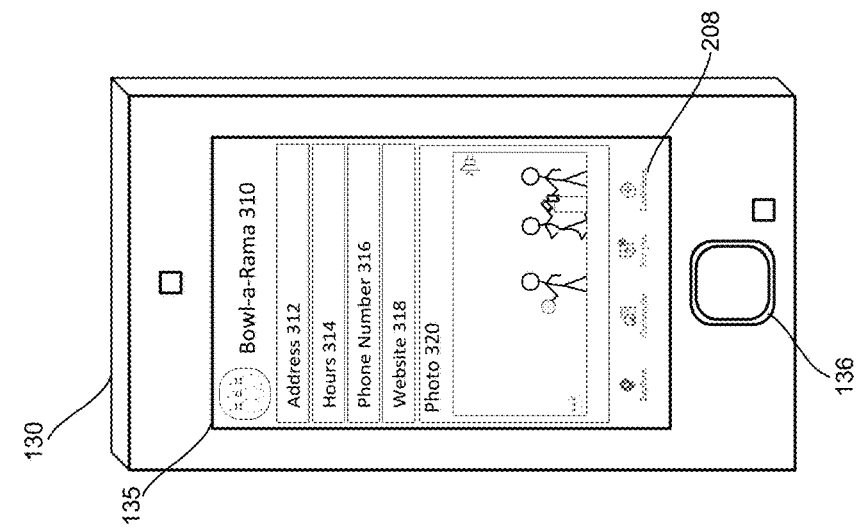
FIG. 3 illustrates an example user interface showing information corresponding to a point of interest in accordance with aspects of the disclosure.

FIG. 3 illustrates a user interface displaying information corresponding to the selected point of interest. For example, the point of interest may be Bowl-a-Rama 310, a nearby bowling alley. Selecting the point of interest may display information and/or content related to the point of interest. As shown, the content may include the address 312, hours 314, phone number 316, website 318, and one or more photos 320 related to Bowl-a-Rama 310. According to some examples, the content may be inaccurate or out of date.

The user interface may include an option, or input button, to contribute 208. Selecting contribute 208 may cause computing device 130 to display a user interface for submitting updated content related to the point of interest. In some examples, contribute 208 may allow a user to check on the status of a submission.

Figure 4:
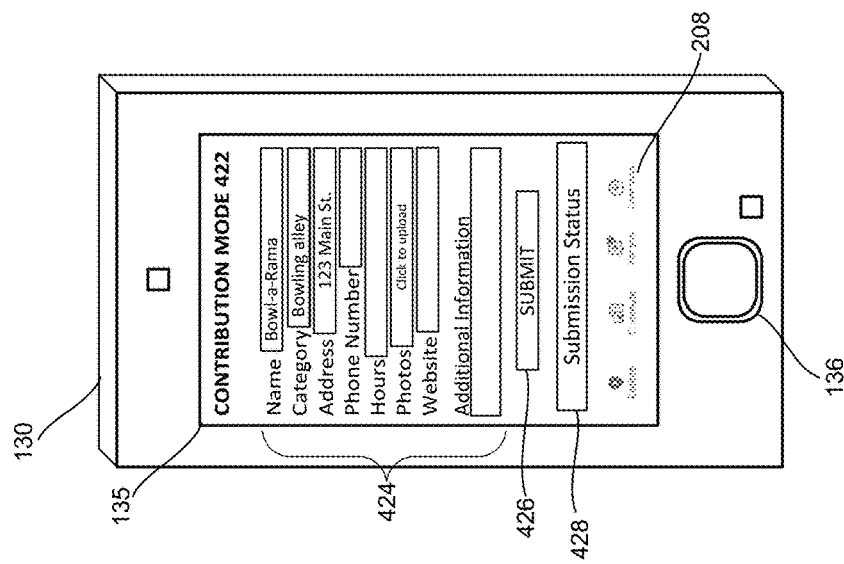
FIG. 4 illustrates an example submission interface in accordance with aspects of the disclosure.

FIG. 4 illustrates an example user interface in contribution mode 422. The user interface for contribution mode 422 may be displayed after contribute 208 is selected. Contribution mode 422 may include one or more input field 424. The input fields 424 may correspond to the types of content displayed when the point of interest is selected by a user. For example, input fields 424 may include name, category, address, phone number, hours, photos, website, additional information, etc.

As shown in FIG. 4, update information related to the point of interest, Bowl-a-Rama 310, may be entered into input fields 424. For example, the category and address may be missing. The category, bowling alley, and address, 123 Main St., may be entered into input fields 424 and submitted to server computing device 150. For example, after update information is entered into input fields 424, selecting submit 426 may transmit the update information to server computing device 150 via network 160. In some examples, contribution mode 422 may include an input for submission status 428. Selecting submission status 428 may cause computing device 130 to display a different user interface which provides status updates related to a submission of content for a point of interest.

Figure 5C:
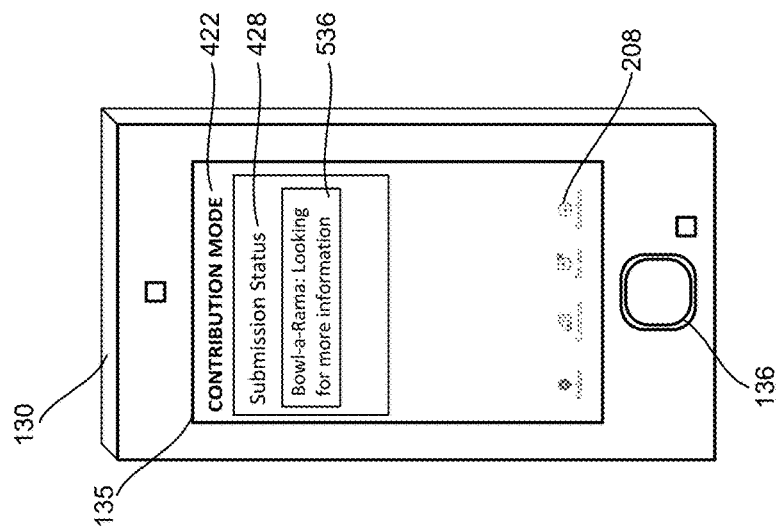
FIGS. 5A-5F illustrate example submission status interfaces in accordance with aspects of the disclosure.
Figure 5B:
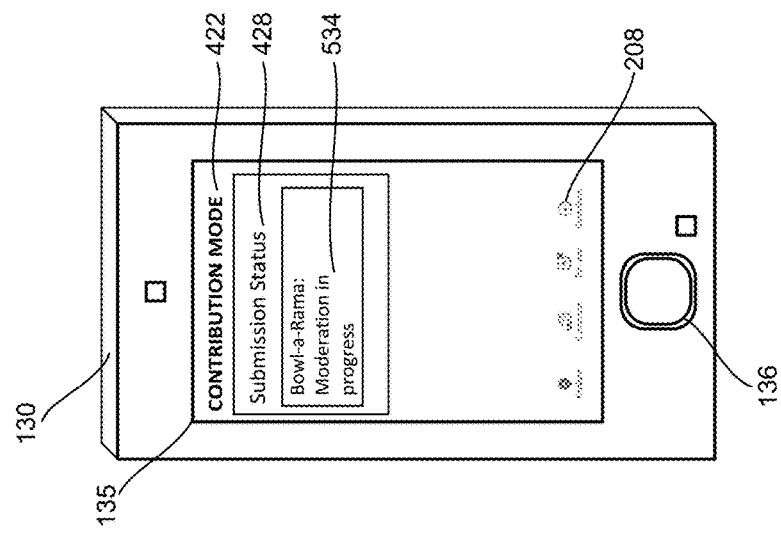
Figure 5A:
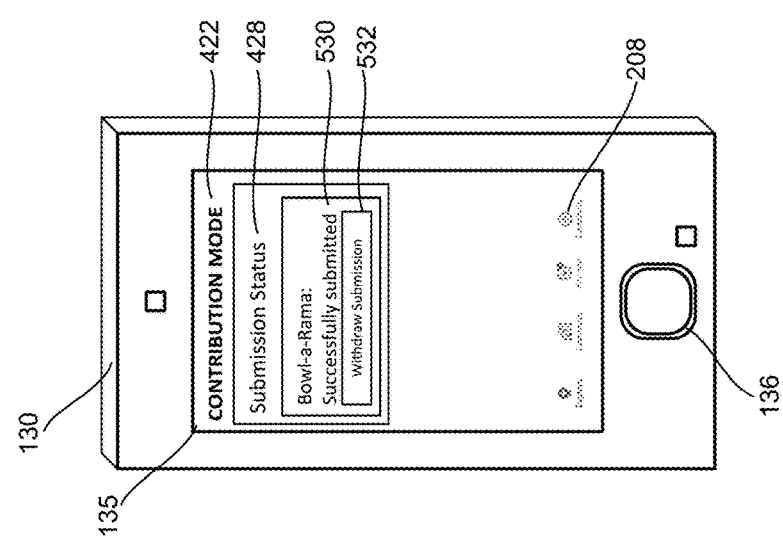

FIGS. 5A-5F illustrate example submission statuses. FIG. 5A illustrates an example submission status after a submission has been submitted to server computing device 150. The submission status 428 after the server computing device 150 receives the submission may be "successfully submitted" 530. After receiving the submission, server computing device 150 may store the submission in input database 172. The submission may additionally or alternatively be stored in system storage 140. Dispatcher 174 may direct the submission to be reviewed by moderation channel 170. In some examples, dispatcher 174 may create a ticket or identify the submission for tracking through the review process.

After a submission has been received by server computing device 150 but before server computing device 150 begins review of the submission, the submission status 428 user interface may provide an option to withdrawn submission 532. A submission may be withdrawn due to errors or typos in the submission, wrong content being submitted, etc.

FIG. 5B illustrates an example submission status after server computing device 150 and/or moderation channel 170 begins review of the submission. For example, after server computing device 150 begins review of the submission, edit state machine 176 may change the submission status from "successfully submitted" 530 to "moderation in progress" 534. While the submission status is shown as "moderation in progress," the submission status may be any indication that the submission is currently being reviewed such as "in review," "please wait, decision will be updated," etc. According to some examples, edit manager 178 may transmit a notification to computing device 130. The notification may be displayed on display 135 of computing device 130 and may indicate the workflow status of the submission.

While moderation is in progress, moderation channel 170 and, therefore, moderation platform 184 may review the content within the submission for accuracy, integrity, quality, etc. Moderation channel 170 and/or moderation platform 184 may review the content using a ML model and/or one or more rules. For example, input processor 182 may convert the raw data from the submission into a format that is consumable for the ML model. For example, each of the input fields 424 may correspond to an input feature of the ML model.

The ML model may be trained according to a variety of machine learning techniques, for example using a model trainer configured to train the system and/or ML model. The ML model may be trained according to a supervised learning technique on a training set of input features. The model trainer may pass training input through the system and/or ML model to obtain a forecast corresponding to the training input. For example, the input features, such as the name, address, phone number, street view image, interior images, business hours, etc. pertaining to the point of interest, may be used to determine whether the submission meets a threshold. The output of processing using the ML model may include information reflecting a determination whether the submission meets the threshold. The threshold may correspond to the quality, accuracy, integrity, etc. of the submission.

According to some examples, a submission may include a type of content unknown to the ML model. For example, the submission may update information that was submitted via the "additional information" input field 424. In some examples, the content included in the "additional information" input field 424 may be a new type of content. The new type of content may be content that does not correspond to a predefined input field 424 or an input feature into the ML model.

For example, the new type of content may be related to the type of music played at Bowl-a-Rama 310. Content related to the type of music Bowl-a-Rama 310 plays on a given night may be submitted in the "additional information" input field 424. The ML model may determine the new type of content to be "music." The ML model may be updated such that the new content within the submission is associated with a "music" input feature. The input feature "music" may then be used as part of the ML model for future submissions.

After the ML model reviews the submission, the ML model may determine that the submission does not meet a threshold. In such an example, edit state machine 176 may update the submission status from "moderation in progress" 534 to "looking for more information" 536, as illustrated in FIG. 5C. Edit manager 178 may transmit a notification to computing device 130 indicating that more information is required for further review of the submission. The notification may include specifics regarding what additional information is required. For example, as shown in FIG. 4, an updated address was submitted. The updated address included "123 Main St." but did not include a city, state, or zip code. Edit manager 178 may transmit a notification indicating that a full address, including the city state, and zip code, is required for further review of the submission.

In response to a "looking for more information" 542 status, server computing device 150 may receive a second submission. For example, a user may submit a second submission through the contribution mode 422 user interface. The second submission may include the content or information indicated as necessary for further review. Remoderator 180 may combine the second submission with the first submission to create a combined submission. Input processor 182 may process the combined submission into a format that is consumable for the ML model. The ML model may determine whether the combined submission does or does not meet a threshold.

According to some examples, server computing device 150 may not receive a second submission in response to the "looking for more information" 542 status. In such an example, edit manager 178 may transmit one or more additional notifications requesting the information. For example, edit manager 178 may transmit a notification to client device 130 indicating that server computing device 150 is waiting for additional information, the initial submission is going to expire due to missing information, etc.

In some examples, after the ML model reviews the submission, the ML model may determine that the submission does meet a threshold. In such an example, edit state machine 176 may change the submission status from "moderation in progress" 534 or "looking for more information" 536 to "approved and applied" 538, as illustrated in FIG. 5C. Edit manager 178 may transmit a notification to computing device 130 indicating that the submission has been approved and applied. The notification may include a URL or website address corresponding to the point of interest that provides access to the updated content.

In examples where the submission meets the threshold, the publicly available content related to the point of interest may be updated. The updated content related to the point of interest may be saved and/or stored in storage system 140.

Figure 5F:
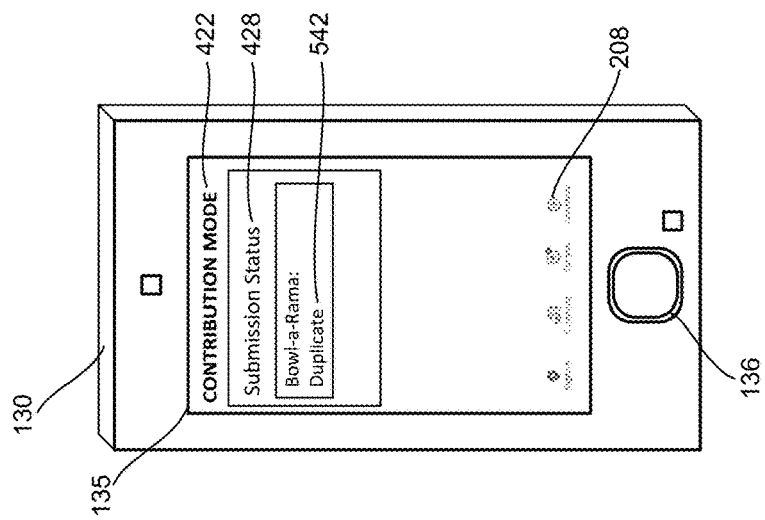
Figure 5E:
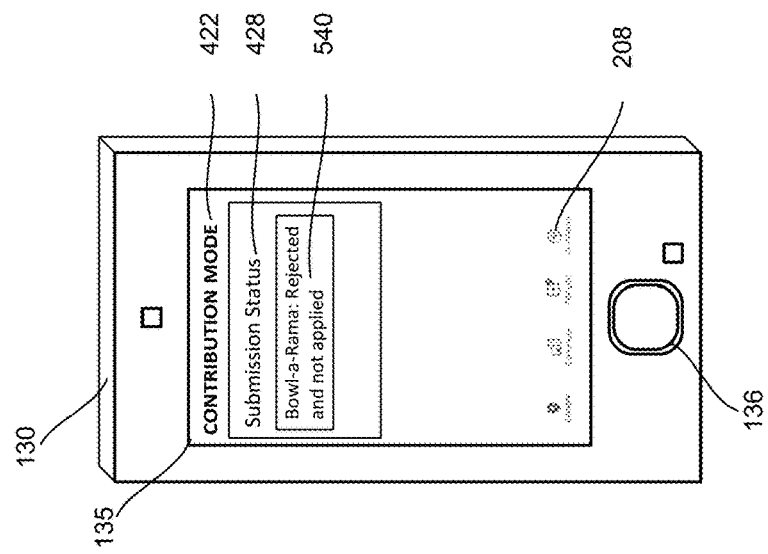
Figure 5D:
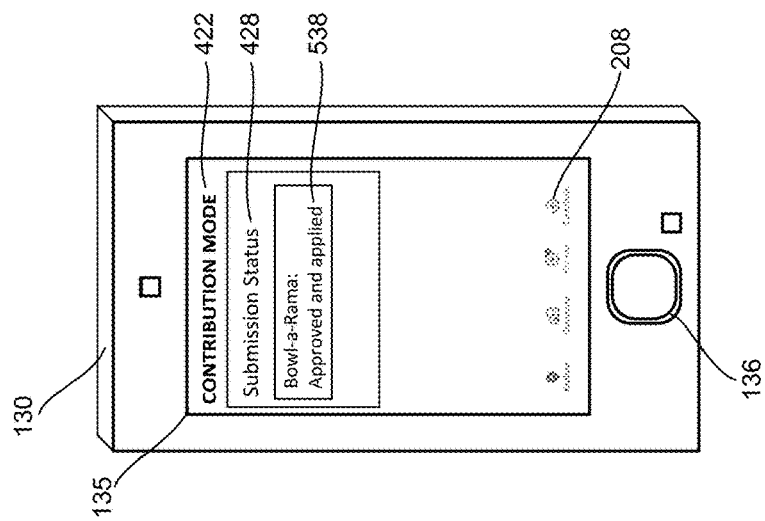

According to some examples, after the ML model reviews the first and/or combined submission, the ML model may determine that the ML model does not meet a threshold. In such an example, edit state machine 176 may change the submission status from "moderation in progress" 534 or "looking for more information" 536 to "rejected and not applied" 540, as illustrated in FIG. 5D. A submission may be rejected and not applied due to quality, integrity, accuracy, etc. of the submission. In some examples, the submission may be rejected for lacking complete information and/or not receiving a secondary submission. Edit manager 178 may transmit a notification to client computing device 130 indicating that the submission has not been approved. A reason for the rejection may be provided within the notification. In addition, the notification may include information that alerts a user that further action is required, including requesting more information, e.g., other information associated with the point of interest.

According to some examples, a submission may not be approved. For example, the submission may not be approve as it may be duplicative of another submission. For example, the ML model may determine that the submission meets the threshold for approval but the content related to the point of interest already includes that information. In some examples, the same submission may be received by server computing device 150 twice. In examples where the content in the submission is duplicative of the published content related to the point of interest and/or the content in the submission is duplicative of another submission, the submission status 428 may change from moderation in progress" 534 or "looking for more information" 536 to "duplicate" 542, as shown in FIG. 5F.

Figure 6:
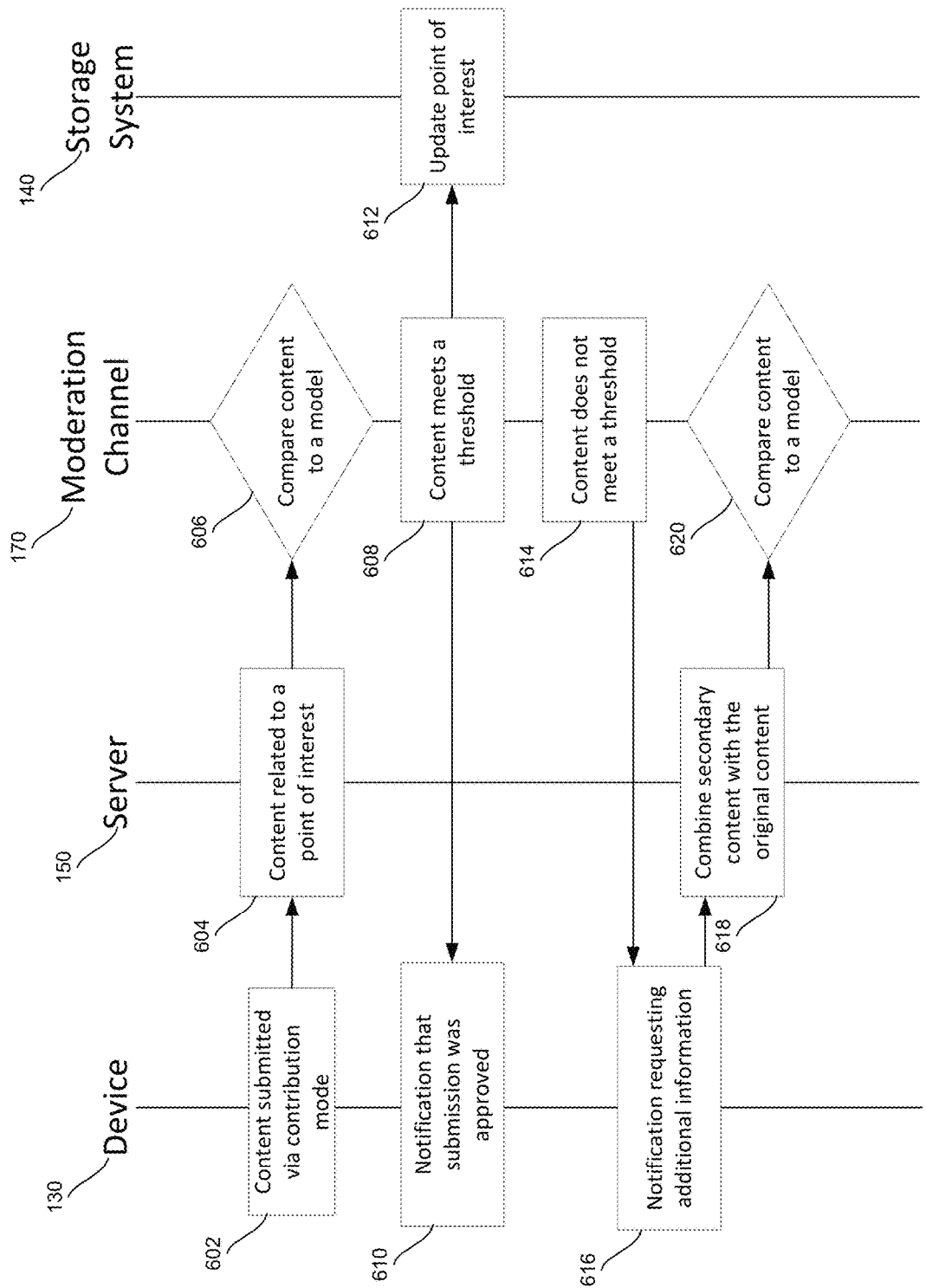
FIG. 6 is a diagram in accordance with aspects of the disclosure.

FIG. 6 illustrates a sequence of steps that may occur among device 130, server 150, moderation channel 170, and storage system 140. The following operations do not have to be performed in the precise order described below. Rather, various operations can be handled in a different order or simultaneously, and operations may be added or omitted.

In block 602, device 130 may submit content, such as update information, via a contribution mode. For example device 130 may have a display for outputting a user interface. The user interface may provide input fields corresponding to content types. A user may interact with the user interface to provide content related to a point of interest. The content may be submitted to server 150 via network 160.

In block 604, server 150 may receive the content related to the point of interest. For example, the content may include update information corresponding to publicly available content and/or content associated with the point of interest. In some examples, the content may include new information related to the point of interest. New information may be content that is not publicly available and/or associated with the point of interest.

In block 606 moderation channel 170 may compare the content of the submission to a model. A ML model may be used to determine whether the content of the submission is associated with the point of interest. Additionally or alternatively, the ML model may compare the content of the submission to a threshold. The threshold may correspond to the quality, accuracy, integrity, associability, etc. of the submission. For example, the submission may be an updated address for the point of interest. The ML model may compare the submitted address to trained models that include address format, address information for other companies, etc. According to some examples, moderation channel 170 may determine whether the submission is associated with the point of interest by comparing features associated with the point of interest with the content of the submission.

In block 608 the moderation channel 170 may determine that the submission meets the threshold and/or that the submission is associable with the point of interest.

In block 610, based on the determination that the submission meets the threshold, moderation channel 170 may transmit a notification to device 130. The notification may indicate that the submission was approved. Additionally or alternatively, in block 612, based on the determination that the submission meets the threshold, the content associated with the point of interest in storage system 140 may be updated.

In block 614 the moderation channel 170 may determine that the submission does not meet the threshold and/or that the submission is not associable with the point of interest.

In block 616, based on the determination that the submission does not meet the threshold, moderation channel 170 may transmit a notification to device 130. The notification may request additional information. In some examples, the notification may include specific details or content to be submitted.

In block 618, server may receive a second submission related to the point of interest and combine the content of the first and second submissions.

In block 620, moderation channel 170 may compare the content of the submission to a model, similar to block 608. The process may repeat itself until moderation channel 170 updates the content associated with the point of interest or determines not to update the content associated with the point of interest. Moderation channel 170 may not update the content associated with the point of interest as the submission content may be duplicative, not enough information may have been provided, etc.

Figure 7:
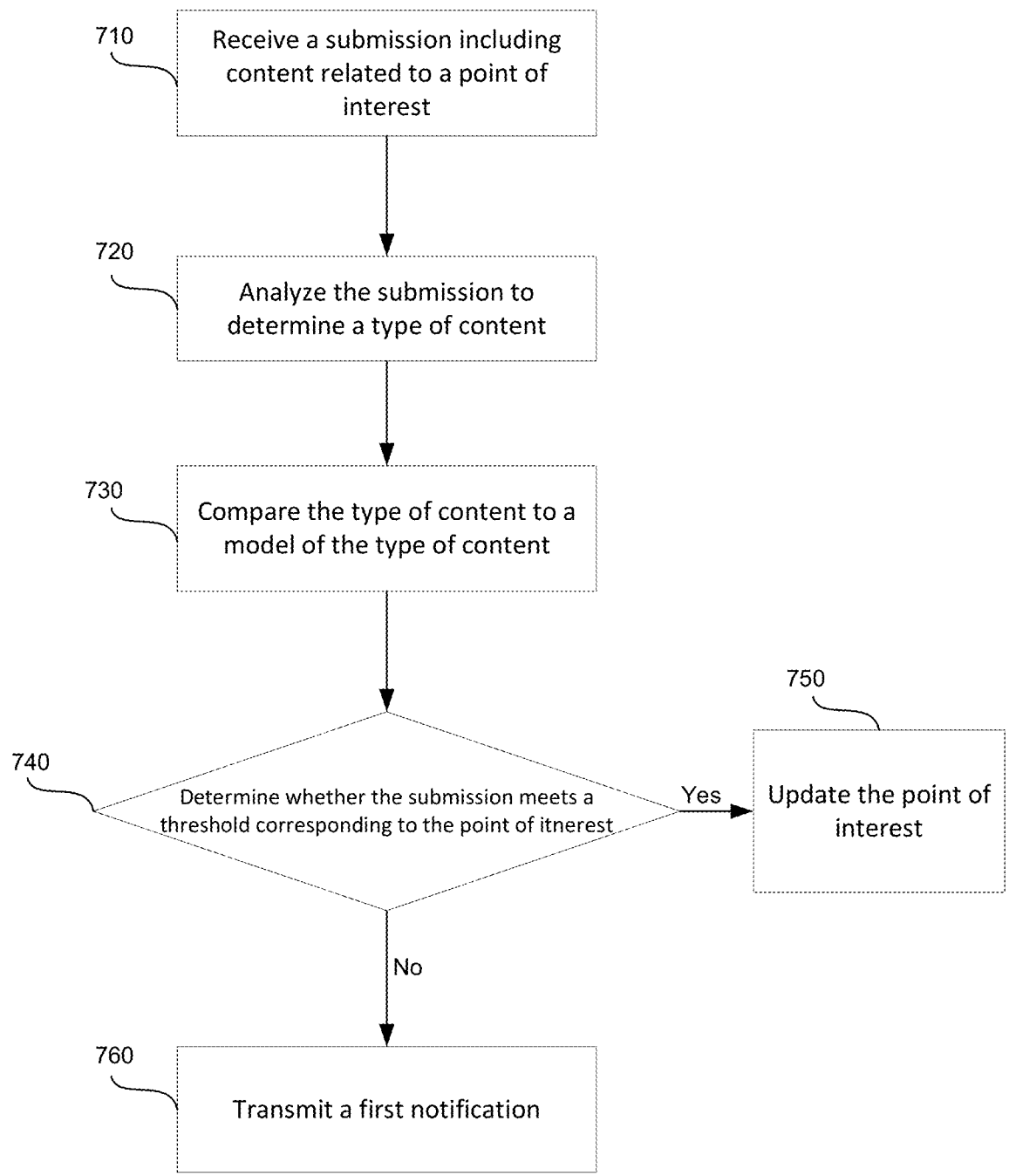
FIG. 7 is a flow diagram in accordance with aspects of the disclosure.

FIG. 7 illustrates an example method for updating information relating to a point of interest. The following operations do not have to be performed in the precise order described below. Rather, various operations can be handled in a different order or simultaneously, and operations may be added or omitted.

In block 710, one or more processors may receive a submission including content related to a point of interest. The content may include update information. For example, the content may include a new address, updated hours of operation, additional photos of the point of interest, etc.

In block 720, the one or more processors may analyze the submission to determine a type of content. The type of content may correspond to the input fields of the user interface. In some examples, the type of content may be different than the input fields of the user interface. In such an example, the one or more processors may determine the type of content and provide a label or field title.

In block 730, the one or more processors may compare the type of content in the submission to a model of the type of content. The model may be a ML model. The ML model may be trained using one or more training examples. The training examples may use the input fields of the user interface as input features to the ML model. The ML model may be updated with additional input features when different and/or additional types of content are determined. In some examples, the ML model may, additionally or alternatively, determine whether the update information in the submission is associable with the point of interest.

In block 740, the one or more processors may determine whether the submission meets a threshold corresponding to the point of interest. The threshold may related to quality, integrity, format, accuracy, etc. For example, if the submission includes update information relating to the address of the point of interest, the submission may be compared to a model of an address to determine whether the format, accuracy, quality, etc. of the update information meets a threshold.

In block 750, if the submission meets the threshold, the one or more processors may update the point of interest.

In block 760, if the submission does not meet the threshold, the one or more processors may transmit a first notification.

The invention claimed is:

1. A method for updating a point of interest on a map, comprising:
receiving, as input through a user interface, a submission having first update information for the point of interest for one or more input fields;
comparing features associated with the point of interest with the first update information to determine whether the first update information is associated with the point of interest,
wherein the comparing comprises providing the first update information as input to a model and comparing features classified in the model as associated with the point of interest with the first update information, and
wherein the first update information is associated with the point of interest when the first update information is associated with a given number of the features;
updating, by an edit state machine based on the comparison, one or more workflow states of the submission, wherein the one or more workflow states includes at least one of withdrawn, moderation in progress, approved and applied, submission in review, rejected and not applied, duplicative, or more information needed;
providing for output, when the comparison indicates that the first update information is associated with the point of interest, a first updated user interface including an indication that the point of interest is updated to include the first update information, wherein the first updated user interface is updated based on the one or more workflow states;
providing for output, when the comparison indicates that the first update information is not associated with the point of interest, a second updated user interface including an indication that the point of interest cannot be updated to include the first update information or a request for additional information associated with the submission, wherein the second updated user interface is updated based on the one or more workflow states; and
receiving, as input through the second updated user interface in response to the indication that the point of interest cannot be updated to include the first update information, a second submission having second update information for the point of interest.

2. The method of claim 1, comprising updating the model if the first update information meets a specified threshold.

3. The method of claim 1, wherein the features comprise one or more of an image of the point of interest, signage associated with the point of interest, or a reference location nearby the point of interest.

4. The method of claim 1, further comprising:
combining the first update information from the submission and the second update information from the second submission to form combined update information;

comparing features associated with the point of interest with the combined update information to determine whether the combined update information is associated with the point of interest;

providing for output, when the comparison indicates that the combined update information is associated with the point of interest, a third updated user interface including an indication that the point of interest is updated to include the combined update information, wherein the third updated user interface is updated based on the one or more workflow states; and providing for output, when the comparison indicates that the combined update information is not associated with the point of interest, a fourth updated user interface including an indication that the point of interest cannot be updated to include the combined update information or a request for additional information associated with the submission, wherein the fourth updated user interface is updated based on the one or more workflow states.

5. The method of claim 1, wherein the first update information includes a new type of content.

6. The method of claim 5, further comprising updating the model to include an input feature corresponding to the new type of content.

7. A non-transitory computer-readable medium storing instructions, which when executed by one or more processors, cause the one or more processors to:

receive, as input through a user interface, a submission having first update information for a point of interest for one or more input fields;

comparing features associated with the point of interest with the first update information to determine whether the first update information is associated with the point of interest,
  wherein the comparing comprises providing the first update information as input to a model and comparing features classified in the model as associated with the point of interest with the first update information, and
  wherein the first update information is associated with the point of interest when the first update information is associated with a given number of the features;

update, by an edit state machine based on the comparison, one or more workflow states of the submission, wherein the one or more workflow states includes at least one of withdrawn, moderation in progress, approved and applied, submission in review, rejected and not applied, duplicative, or more information needed;

provide for output, when the comparison indicates that the first update information is associated with the point of interest, a first updated user interface including an indication that the point of interest is updated to include the first update, wherein the first updated user interface is updated based on the one or more workflow states;

provide for output, when the comparison indicates that the first update information is not associated with the point of interest, a second updated user interface including an indication that the point of interest cannot be updated to include the first update information or a request for additional information associated with the submission, wherein the second updated user interface is updated based on the one or more workflow states; and receive, as input through the second updated user interface in response to the second indication that the point of interest cannot be updated to include the first update information, a second submission having second update information for the point of interest.

8. The non-transitory computer-readable medium of claim 7, wherein the one or more processors further update the model if the first update information meets a specified threshold.

9. The non-transitory computer-readable medium of claim 7, wherein the features comprise one or more of an image of the point of interest, signage associated with the point of interest, or a reference location nearby the point of interest.

10. The non-transitory computer-readable medium of claim 7, wherein the one or more processors are further configured to:

combine the first update information from the submission and the second update information from the second submission to form combined update information;

comparing features associated with the point of interest with the combined update information to determine whether the combined update information is associated with the point of interest;

provide for output, when the comparison indicates that the combined update information is associated with the point of interest, a third updated user interface including an indication that the point of interest is updated to include the combined update information, wherein the third updated user interface is updated based on the one or more workflow states; and provide for output, when the comparison indicates that the combined update information is not associated with the point of interest, a fourth updated user interface that the point of interest cannot be updated to include the combined update information or a request for additional information associated with the submission, wherein the fourth updated user interface is updated based on the one or more workflow states.

11. The non-transitory computer-readable medium of claim 7, wherein the first update information includes a new type of content.

12. The non-transitory computer-readable medium of claim 11, wherein the one or more processors are further configured to update the model to include an input feature corresponding to the new type of content.

13. A method, comprising:

receiving, by one or more processors, a submission including first content for one or more input fields related to a point of interest;

analyzing, by the one or more processors, the submission to determine a type of content;

classifying, by the one or more processors, the type of content using a model;

comparing, by the one or more processors based on the classification of the type of content, features associated with the point of interest with the submission to determine whether the submission meets a threshold corresponding to the point of interest,
  wherein the comparing comprises providing the submission as input to the model and comparing features classified in the model as associated with the point of interest with the submission, and
  wherein the submission is associated with the point of interest when the submissions is associated with a given number of features; and updating, by an edit state machine based on the comparison, one or more workflow states of the submission, wherein the one or more workflow states includes at least one of withdrawn, moderation in progress, approved and applied, submission in review, rejected and not applied, duplicative, or more information needed;

providing for output, by the one or more processors when the comparison indicates that the submission meets the threshold corresponding to the point of interest, a first updated user interface including an indication that the point of interest is updated to include the first content, wherein the first updated user interface is updated based on the one or more workflow states, or providing for output, by the one or more processors when the comparison indicates that the submission does not meet the threshold corresponding to the point of interest, a second updated user interface, wherein the second updated user interface is updated based on the one or more workflow states; and receiving, by the one or more processors through the second updated user interface, a second submission having second content.

14. The method of claim 13, wherein the second updated user interface includes a request for additional content related to the point of interest.

15. The method of claim 13, wherein when the point of interest is updated to include the first content, the method further includes transmitting, by the one or more processors, a second notification including a uniform resource locator ("URL") corresponding to the updated point of interest.

16. The method of claim 13, wherein the model is a machine learning model.

17. The method of claim 16, wherein the machine learning model includes input features corresponding to one or more types of content.

18. The method of claim 17, wherein the one or more types of content includes a name, an address, a phone number, one or more street view images, one or more interior images, or business hours corresponding to the point of interest.

19. The method of claim 13, further comprising:
combining, by the one or more processors, the submission and the second submission to form an updated submission;

analyzing, by the one or more processors, the updated submission to determine a second type of content;

classifying, by the one or more processors, the second type of content using the model;

comparing, by the one or more processors based on the classification of the second type of content, features associated with the point of interest with the updated submission to determine whether the updated submission meets the threshold corresponding to the point of interest; and providing for output, by the one or more processors when the comparison indicates that the updated submission meets the threshold, a third updated user interface including an indication that the point of interest is updated to include the updated submission, wherein the third updated user interface is updated based on the one or more workflow states, or providing for output, by the one or more processors when the comparison indicates that the updated submission does not meet the threshold, a fourth updated user interface, wherein the fourth updated user interface is updated based on the one or more workflow states.

20. The method of claim 13, wherein the first and second update users interfaces includes a status notification indicating at least one of the one or more workflow states of the submission.

* * * * *